United States Patent
Coman

(10) Patent No.: US 10,739,489 B2
(45) Date of Patent: Aug. 11, 2020

(54) LOW GRADIENT MAGNETIC RESONANCE LOGGING FOR MEASUREMENT OF LIGHT HYDROCARBON RESERVOIRS

(71) Applicant: Radu Coman, Hannover (DE)

(72) Inventor: Radu Coman, Hannover (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 360 days.

(21) Appl. No.: 14/997,195

(22) Filed: Jan. 15, 2016

(65) Prior Publication Data

US 2017/0205527 A1    Jul. 20, 2017

(51) Int. Cl.
*G01V 3/32* (2006.01)

(52) U.S. Cl.
CPC ..................... *G01V 3/32* (2013.01)

(58) Field of Classification Search
CPC ... G01V 3/18; G01V 3/32; G01V 3/34; G01V 3/36; G01V 3/38; G01V 3/40; G01V 2210/6169; G01R 33/44
USPC ................................................ 324/300–322
See application file for complete search history.

(56) References Cited

U.S. PATENT DOCUMENTS

| | | | |
|---|---|---|---|
| 4,983,942 A * | 1/1991 | Benesch | G01R 33/3873 324/318 |
| 5,498,960 A * | 3/1996 | Vinegar | G01V 3/32 324/303 |
| 5,585,720 A * | 12/1996 | Edwards | G01R 33/4625 324/303 |
| 5,680,043 A * | 10/1997 | Hurlimann | G01N 24/081 324/303 |

(Continued)

FOREIGN PATENT DOCUMENTS

| WO | WO 2017123720 A1 * | 7/2017 | ............... G01V 3/32 |
|---|---|---|---|
| WO | WO-2017123720 A1 * | 7/2017 | ............... G01V 3/32 |

OTHER PUBLICATIONS

Coman et al., Lateral-Motion Correction of NMR Logging-While-Drilling Data, Society of Petrophysicists and Well-Log Analysts. SPWLA 59th Annual Loggign Symposium—London, UK. (Year: 2018).*

(Continued)

*Primary Examiner* — Patrick Assouad
*Assistant Examiner* — Sean Curtis
(74) *Attorney, Agent, or Firm* — Cantor Colburn LLP

(57) ABSTRACT

An embodiment of a method of performing a nuclear magnetic resonance (NMR) measurement includes disposing a NMR measurement device in a carrier in an earth formation, applying a static magnetic field into a formation, and emitting a plurality of pulse sequences into the formation, the plurality of pulse sequences including at least a first pulse sequence having a first wait time and a second pulse sequence having a second wait time. The method also includes receiving a long wait-time echo train based on the first pulse sequence and a short wait-time echo train based on the second pulse sequence. The method further includes transforming, by a processor, the echo trains into volumetric portions including a first fluid volumetric portion, estimating a longitudinal relaxation time for the first fluid volumetric portion; and identifying whether the first fluid volumetric portion is gas or light oil based on the estimated longitudinal relaxation time.

20 Claims, 4 Drawing Sheets

(56) References Cited

U.S. PATENT DOCUMENTS

| | | | | |
|---|---|---|---|---|
| 6,032,101 | A * | 2/2000 | Freedman | G01N 24/081 702/8 |
| 6,051,973 | A * | 4/2000 | Prammer | G01N 24/081 324/303 |
| 6,097,184 | A * | 8/2000 | Flaum | G01V 3/32 324/303 |
| 6,242,913 | B1 | 6/2001 | Prammer | G01N 24/081 324/300 |
| 6,255,818 | B1 * | 7/2001 | Heaton | G01R 33/563 324/303 |
| 6,268,726 | B1 * | 7/2001 | Prammer | G01V 3/32 324/303 |
| 6,362,619 | B2 * | 3/2002 | Prammer | G01V 3/32 324/303 |
| 6,366,087 | B1 * | 4/2002 | Coates | G01N 24/081 324/303 |
| 6,392,409 | B1 * | 5/2002 | Chen | G01N 24/081 324/303 |
| 6,512,371 | B2 * | 1/2003 | Prammer | G01N 24/081 324/303 |
| 6,531,868 | B2 * | 3/2003 | Prammer | G01N 24/081 324/300 |
| 6,583,621 | B2 * | 6/2003 | Prammer | G01V 3/32 324/303 |
| 6,661,226 | B1 * | 12/2003 | Hou | G01N 24/081 324/303 |
| 6,717,404 | B2 * | 4/2004 | Prammer | G01N 24/081 324/300 |
| 6,825,657 | B2 * | 11/2004 | Kleinberg | G01N 24/081 324/303 |
| 6,825,658 | B2 * | 11/2004 | Coates | G01N 24/081 324/303 |
| 6,825,659 | B2 * | 11/2004 | Prammer | G01V 3/32 324/303 |
| 6,956,371 | B2 * | 10/2005 | Prammer | G01N 24/081 324/300 |
| 7,176,682 | B2 | 2/2007 | Galford et al. | |
| 7,180,288 | B2 * | 2/2007 | Scheven | G01N 24/081 324/300 |
| 7,196,516 | B2 | 3/2007 | Blanz et al. | |
| 7,199,580 | B2 * | 4/2007 | Akkurt | G01N 24/081 324/303 |
| 7,298,142 | B2 * | 11/2007 | Hursan | G01N 24/08 324/303 |
| 7,346,454 | B2 * | 3/2008 | Mathieu | G01V 3/20 367/33 |
| 7,358,725 | B2 * | 4/2008 | Blanz | G01N 24/081 324/303 |
| 7,463,027 | B2 * | 12/2008 | Prammer | G01N 24/081 324/303 |
| 7,501,818 | B2 * | 3/2009 | Akkurt | G01N 24/081 324/303 |
| 7,511,487 | B2 * | 3/2009 | Badry | G01N 24/081 324/303 |
| 7,733,086 | B2 * | 6/2010 | Prammer | G01V 3/32 324/300 |
| 7,741,841 | B2 * | 6/2010 | Edwards | G01V 3/32 324/303 |
| 7,755,354 | B2 * | 7/2010 | Akkurt | G01N 24/081 324/300 |
| 7,804,297 | B2 * | 9/2010 | Romero | G01N 24/081 324/303 |
| 7,808,238 | B2 * | 10/2010 | Chen | G01V 3/32 324/303 |
| 7,812,602 | B2 * | 10/2010 | Edwards | G01V 3/32 324/303 |
| 8,131,469 | B2 * | 3/2012 | Chen | G01N 24/081 702/8 |
| 8,174,262 | B2 * | 5/2012 | Fransson | G01N 24/081 324/300 |
| 9,201,158 | B2 * | 12/2015 | Freed | G01N 24/081 |
| 9,658,359 | B2 * | 5/2017 | Dirksen | G01V 3/32 |
| 9,715,033 | B2 * | 7/2017 | Freed | G01V 3/32 |
| 9,733,383 | B2 * | 8/2017 | Freed | G01V 3/32 |
| 10,126,457 | B2 * | 11/2018 | Coman | G01V 3/32 |
| 10,280,745 | B2 * | 5/2019 | Eyuboglu | E21B 49/081 |
| 10,301,924 | B2 * | 5/2019 | Utsuzawa | G01V 3/14 |
| 10,466,381 | B2 * | 11/2019 | Coman | G01R 33/448 |
| 2001/0045829 | A1 * | 11/2001 | Prammer | G01V 3/32 324/303 |
| 2002/0163335 | A1 * | 11/2002 | Prammer | G01V 3/32 324/303 |
| 2003/0016012 | A1 | 1/2003 | Coates et al. | |
| 2004/0124837 | A1 * | 7/2004 | Prammer | G01V 3/32 324/303 |
| 2006/0290350 | A1 | 12/2006 | Hursan et al. | |
| 2008/0206887 | A1 | 8/2008 | Chen et al. | |
| 2009/0167302 | A1 * | 7/2009 | Edwards | G01V 3/32 324/303 |
| 2013/0187648 | A1 * | 7/2013 | Freed | G01N 24/081 324/303 |
| 2015/0241541 | A1 * | 8/2015 | Blanz | G01R 33/56509 324/303 |
| 2016/0018555 | A1 * | 1/2016 | Jachmann | G01V 3/32 324/303 |
| 2016/0047935 | A1 * | 2/2016 | Ali | G01V 3/32 702/7 |
| 2016/0047936 | A1 * | 2/2016 | Ali | G01V 3/32 324/303 |
| 2016/0076924 | A1 * | 3/2016 | Pusiol | G01F 1/716 324/306 |
| 2016/0116629 | A1 * | 4/2016 | Coman | G01V 3/32 324/303 |
| 2016/0202384 | A1 * | 7/2016 | Utsuzawa | G01V 3/18 324/303 |
| 2016/0320519 | A1 * | 11/2016 | Blanz | G01V 3/32 |
| 2016/0334533 | A1 * | 11/2016 | Coman | G01V 3/32 |
| 2017/0184755 | A1 * | 6/2017 | Coman | G01V 3/32 |
| 2017/0205527 | A1 * | 7/2017 | Coman | G01V 3/32 |
| 2017/0254919 | A1 * | 9/2017 | Coman | G01R 33/448 |
| 2017/0285214 | A1 * | 10/2017 | Kischkat | G01V 3/32 |
| 2017/0322337 | A1 * | 11/2017 | Prasad | G01V 3/32 |
| 2017/0351002 | A1 * | 12/2017 | Coman | G01V 3/38 |
| 2019/0056524 | A1 * | 2/2019 | Reiderman | G01V 3/32 |
| 2019/0271224 | A1 * | 9/2019 | Utsuzawa | G01V 3/14 |

OTHER PUBLICATIONS

PetroWiki, Fluid Typing with NMR Logging, https://petrowiki.org/fluid_typing_with_NMR_logging, Jan. 2015. (Year: 2015).*

PetroWiki, Fluid Typing with NMR Logging, https://petrowiki.org/fluid_typing_with_NMRJogging, Jan. 2015. (Year: 2015).*

Horkowitz et al., Applications of a New Magnetic Resonance Logging-While-Drilling Tool in a Gulf of Mexico Deepwater Development Project. SPWLA 43rd Annual Logging Symposium, Jun. 2-5, 2002 (Year: 2002).*

Akkurt,R. et al, NMR Logging of Natural Gas Reservoirs, The Log Analyst 37, Nov.-Dec. (1996)., 10 pages.

Coates, et al., NMR Logging Principles & Applications; Halliburton Energy Services Publication (1999); pp. 1-120.

Coates, et al., NMR Logging Principles & Applications; Halliburton Energy Services Publication (1999); pp. 121-233.

Coman, et al., "Improved NMR Logging Approach to Simultaneously Determine Porosity, T2 and T1"; SPE-175050-MS, SPE Annual Technical Conference and Exhibition, Houston, Texas, USA; Sep. 28-30, 2015; 27 pages.

Dunn, et al.; "Nuclear Magnetic Resonance: Petrophysical and logging application"; 2002; 10 pages.

Goelman, et al., "The CPMG Pulse Sequence in Strong Magnetic Field Gradients with Applications to Oil-Well Logging", Journal of Magnetic Resonance, Series A 113, 11-18(1995). 8 pages.

Prammer, et al., "Lithology-Inependent Gas Detection by Gradient-NMR Logging", SPE 30562 (1995).,12 pages.

International Search Report, International Application No. PCT/US2017/013140, dated Apr. 21, 2017, Korean Intellectual Property Office; International Search Report 4 pages.

(56) References Cited

OTHER PUBLICATIONS

International Written Opinion, International Application No. PCT/US2017/013140, dated Apr. 21, 2017, Korean Intellectual Property Office; International Written Opinion 8 pages.
European Search Report for European Application No. 17738905.3, International Filing Date Jan. 12, 2017, dated Apr. 8, 2019, 11 pages.
Xie Ranhong et al., "Advanced Fluid-Typing Methods for NMR Logging", Petroleum Science, China University of Petroleum (Beijing), Heidelberg, vol. 8, No. 2, May 28, 2011, pp. 163-169.

* cited by examiner

LOW GRADIENT MAGNETIC RESONANCE LOGGING FOR MEASUREMENT OF LIGHT HYDROCARBON RESERVOIRS

BACKGROUND

Understanding the characteristics of geologic formations and fluids located therein is important for effective hydrocarbon exploration and production. Formation evaluation relies on accurate petrophysical interpretation derived from a diverse set of logging technologies. One such technology, nuclear magnetic resonance (NMR), can be used to estimate formation characteristics such as mineralogy-independent porosity and permeability of rocks, to perform fluid typing and determine fluid volumes, and to estimate fluid characteristics such as viscosity.

Various properties of formations can be derived from NMR measurements, such as porosity, volumetrics, permeability, saturation, viscosity, fluid type and pore size distribution. Sourceless porosity is an important trend in formation evaluation, and NMR logging is considered to be a potential replacement of the standard density-neutron approach to measure formation porosity. One major difficulty of NMR logging is to provide accurate porosity in a gas reservoir, and the conventional wisdom is that standalone low-gradient NMR logging tools are not appropriate for logging in light oil and gas reservoirs.

SUMMARY

An embodiment of a method of performing a nuclear magnetic resonance (NMR) measurement includes disposing a NMR measurement device in a carrier in an earth formation, the NMR measurement device including a magnetic field source and a transmitting assembly, applying a static magnetic field into a formation by the magnetic field source, and emitting a plurality of pulse sequences by the transmitting assembly into the formation, the plurality of pulse sequences including at least a first pulse sequence having a first wait time and a second pulse sequence having a second wait time. The method also includes receiving NMR measurement data including a long wait-time echo train and a short wait-time echo train, the long wait-time echo train based on the first pulse sequence and the short wait-time echo train based on the second pulse sequence. The method further includes transforming, by a processor, the echo trains into volumetric portions including a first fluid volumetric portion, estimating a longitudinal relaxation time for the first fluid volumetric portion; and identifying whether the first fluid volumetric portion is gas or light oil based on the estimated longitudinal relaxation time.

An embodiment of a nuclear magnetic resonance (NMR) apparatus for estimating properties of an earth formation includes an NMR measurement device configured to be disposed in a carrier in an earth formation, the NMR measurement device including a magnetic field source and a transmitting assembly, the magnetic field source configured to apply a static magnetic field into a formation, the transmitting assembly configured to emit a plurality of pulse sequences into the formation, the plurality of pulse sequences including at least a first pulse sequence having a first wait time and a second pulse sequence having a second wait time. The apparatus also includes a processor configured to receive NMR measurement data including a long wait-time echo train and a short wait-time echo train, the long wait-time echo train based on the first pulse sequence and the short wait-time echo train based on the second pulse sequence. The processor is configured to perform: transforming the echo trains into volumetric portions including a first fluid volumetric portion; estimating a longitudinal relaxation time for the first fluid volumetric portion; and identifying whether the first fluid volumetric portion is gas or light oil based on the estimated longitudinal relaxation time.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Methods, systems and apparatuses for measuring characteristics of an earth formation using low gradient magnetic resonance techniques are described herein. Embodiments of nuclear magnetic resonance (NMR) apparatuses, systems and methods utilize low gradient NMR measurements to perform various measurements of formation characteristics, including measurements related to light hydrocarbons. The measurements include porosity, diffusivity, viscosity, gas detection, hydrocarbon typing and hydrogen index (HI) correction in formation regions such as light oil and/or gas reservoirs, and other formations that include or may potentially include light hydrocarbons or other fluids that can be sensed by NMR techniques.

In one embodiment, the systems, apparatuses and methods described herein utilize dual wait time (DTW) pulse sequences that include a first pulse sequence having a first wait time and a second pulse sequence having a second wait time. An embodiment of an NMR apparatus is configured to estimate a volume of light hydrocarbon by determining a partial porosity of a light hydrocarbon volumetric based on a $T_2$ distribution derived from DTW echo trains, and estimating a $T_1$ distribution or value (T1λ) of the light hydrocarbon volumetric. The $T_{1\lambda}$ distribution or value is used to identify whether the light hydrocarbon (or a portion thereof) is gas or light oil. In one embodiment, a diffusivity value is calculated based on the $T_{1\lambda}$ distribution or value and the $T_2$ distribution, and differentiation between gas and light oil is performed based on the diffusivity value.

Figure 1:
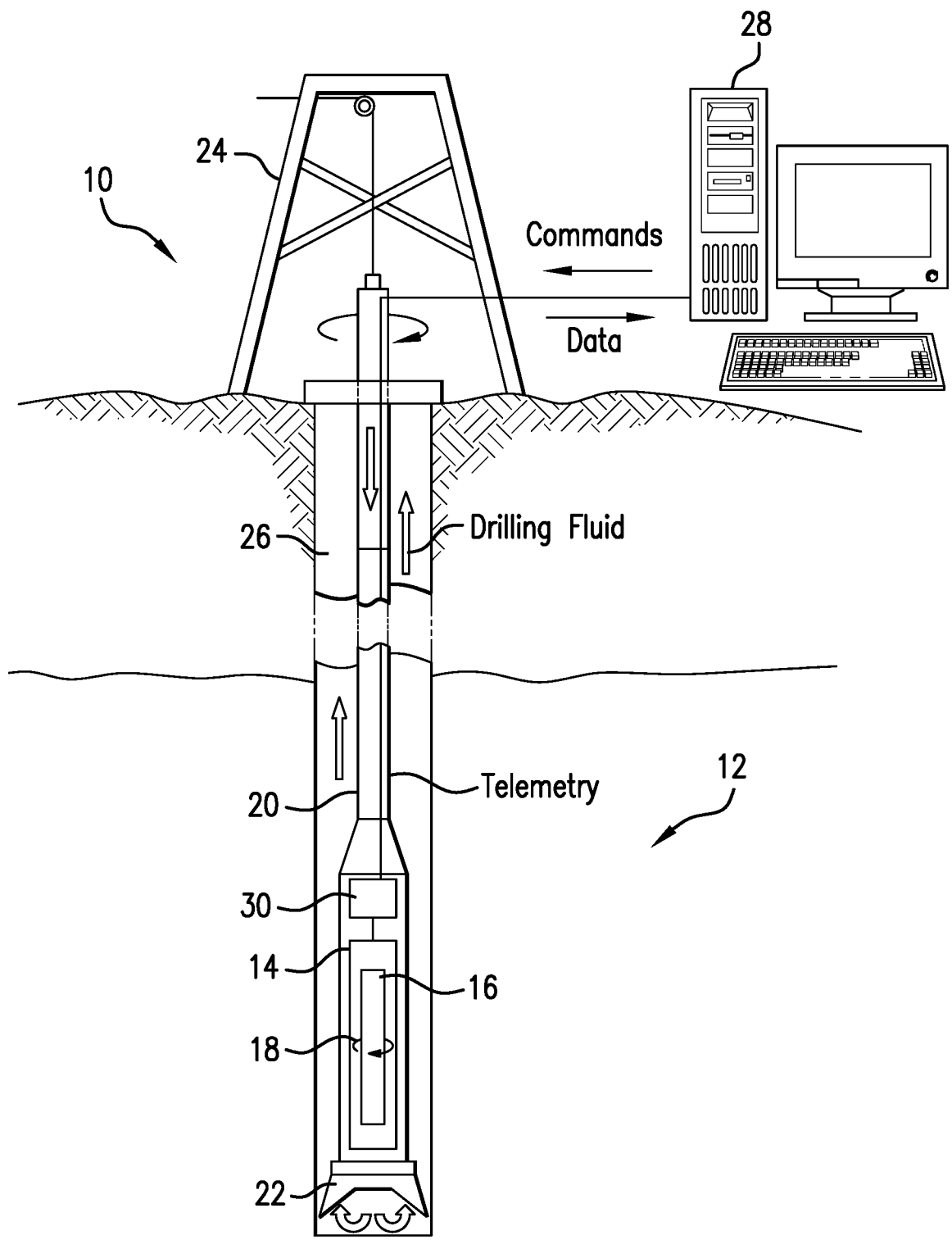
FIG. 1 depicts an embodiment of a formation measurement system that includes a nuclear magnetic resonance (NMR) measurement apparatus.

FIG. 1 illustrates an exemplary embodiment of a downhole measurement, data acquisition, and/or analysis system 10 that includes devices or systems for in-situ measurement of characteristics of an earth formation 12. The system 10 includes a magnetic resonance apparatus such as an NMR tool 14. An example of the magnetic resonance apparatus is a logging-while-drilling (LWD) magnetic resonance tool. The tool 14 is configured to generate magnetic resonance data for use in estimating characteristics of a formation, such as but not limited to porosity, irreducible water saturation, permeability, hydrocarbon content, and fluid viscosity.

An exemplary tool 14 includes a static magnetic field source 16, such as a permanent magnet assembly, that magnetizes formation materials and a transmitter and receiver assembly 18 (e.g., an antenna or antenna assembly) that transmits radio frequency (RF) energy or pulsed energy that provides an oscillating magnetic field in the formation, and detects NMR signals, for instance as voltages induced in the receiver. The transmitter assembly 18 may serve the receive function, or one or more distinct receiving antennas may be used for that purpose. It can be appreciated that the tool 14 may include a variety of components and configurations as known in the art of nuclear magnetic resonance or magnetic resonance imaging.

The tool 14 may be configured as a component of various subterranean systems, such as wireline well logging and LWD systems. For example, the tool 14 can be incorporated within a drill string 20 including a drill bit 22 or other suitable carrier and deployed downhole, e.g., from a drilling rig 24 into a borehole 26 during a drilling operation. The tool 14 is not limited to the embodiments described herein, and may be deployed in a carrier with alternative conveyance methods. A "carrier" as described herein means any device, device component, combination of devices, media and/or member that may be used to convey, house, support or otherwise facilitate the use of another device, device component, combination of devices, media, and/or member. Exemplary non-limiting carriers include drill strings of the coiled tube type, of the jointed pipe type, wired jointed drill pipe, and any combination or portion thereof. Other carrier examples include casing pipes, wirelines, wireline sondes, slickline sondes, drop shots, downhole subs, bottom-hole assemblies, and drill strings.

In one embodiment, the tool 14 and/or other downhole components are equipped with transmission equipment to communicate ultimately to a surface processing unit 28. Such transmission equipment may take any desired form, and different transmission media and methods may be used, such as wired, fiber optic, and/or wireless transmission methods. Additional processing units may be deployed with the carrier. For example, a downhole electronics unit 30 includes various electronic components to facilitate receiving signals and collect data, transmitting data and commands, and/or processing data downhole. The surface processing unit 28, electronics 30, the tool 14, and/or other components of the system 10 may include devices as necessary to provide for storing and/or processing data collected from the tool 14 and other components of the system 10. Exemplary devices include, without limitation, at least one of a processor, a storage, a memory, an input device, an output device, and the like.

Magnetic resonance measurements are performed by the NMR tool 14, which generates a static magnetic field ($B_0$) in a volume within the formation (a "volume of interest") using one or more magnets (e.g., the magnetic field source 16). The term "static" herein refers to a magnetic field with a variation that is considerably slower than the duration of the pulse echoes described further below. An oscillating (e.g., RF) magnetic field ($B_1$), which is at least partially substantially perpendicular to the static magnetic field, is generated in the volume of interest. The volume of interest may be circular or toroidal around the borehole, and/or focused or directed toward a specific angular region (i.e., side-looking).

The surface processing unit 28, electronics 30 and/or other suitable processing device includes a processor configured to generate electrical pulses that causes the transmitter assembly to generate pulses of electromagnetic energy that induce the oscillating field $B_1$ in the volume of interest. Such a processing device may be referred generally as a pulse generator, which includes a microcontroller or other processor that is capable of transmitting a pulse sequence or series of pulse sequences. Each pulse sequence can be programmed or set based on parameters such as pulse duration, time intervals between pulses and time between successive pulse sequences (wait time).

When exposed to the magnetic field $B_0$, the spin axes of hydrogen nuclei in the formation process around the direction of the $B_0$ field with the Larmor frequency, which is proportional to the strength of the magnetic field $B_0$. The direction of orientation of the field $B_0$ in the formation volume of interest is referred to as the longitudinal direction or z-direction.

Over time, the spin axes align themselves at distinct angles along the $B_0$ field and create a net magnetization (i.e., polarization), which will build up with the time constant $T_1$, referred to as a longitudinal relaxation or spin lattice relaxation time. $T_2$ is a time constant known as the transversal relaxation, which describes the loss of magnetization in the plane orthogonal to the $B_0$ field.

The $B_1$ field is typically applied as a sequence of short duration pulses, referred to as a "pulse sequence" or "data gathering sequence", which may be rectangular or other shaped pulses. A pulse sequence is used to measure $T_2$ relaxation, and is also indirectly used also for the measurement of the $T_1$ relaxation. In an embodiment of a pulse sequence, the first pulse is a "tipping pulse", which acts to align the nuclear magnetization in the formation in a direction perpendicular to the static field $B_0$, e.g., rotate the magnetization from the z-direction into the x-y plane. After the tipping pulse, the nuclear magnetic moment of the nuclei gradually return or "relax" to their alignment with the static field.

At a selected time after the tipping pulse, one or more "refocusing pulses" are applied, which have durations and amplitudes selected to at least partly reverse the magnetizations of microscopic volume elements. In consequence the coherent macroscopic magnetization that was lost after the tipping pulse rephases after each refocus pulse, resulting in so-called spin echoes that induce a measurable voltage in the receiving antenna.

The refocus pulses restore only the transversal magnetization that gets lost due to the inhomogeneity of the $B_0$ field. The loss of magnetization due to relaxation processes cannot be restored and will happen with a time $T_2$.

Pulse sequence parameters include wait time ($T_W$), echo spacing or inter-echo time ($T_E$), and the number of echoes ($N_E$) produced by a sequence. The wait time is the period of time between initial application of the static magnetic field and the onset of the first pulse sequence or the period of time between successive pulse sequences. Nuclear magnetization of the volume of interest is produced during the wait time. After a pulse sequence, the nuclear magnetization is practically zero and another wait time is used to re-establish the magnetization prior to application of the next sequence.

Parameters may be selected based on considerations such as anticipated formation properties and anticipated fluid types and properties. $T_W$ can be selected to measure different formation types and regions expected to have different $T_1$ ranges. For example, a longer $T_W$, usually in connection with a larger number of echoes, is useful for movable or non-wetting fluids, and a shorter $T_W$ is useful for shaly formations.

An example of a pulse sequence that can be applied by the NMR tool is a Carr-Purcell-Meiboom-Gill (CPMG) pulse sequence, which has a constant time $2*\tau=T_E$ between the refocus pulses, where "$\tau$" is the time between the tipping pulse and the first refocusing pulse. The advantage of a CPMG-like sequence is its simplicity (equal spacing between refocus pulses and echoes), the constant echo spacing ($T_E$) and relatively high echo signals. Note that, for a CPMG pulse sequence, the inter-pulse time interval is the same as the inter-echo time interval, $T_E$.

In an inhomogeneous $B_0$ field, a refocus pulse cannot keep all of the original magnetization in the x-y plane and some of it is rotated into the z-direction. This magnetization stored in the z-direction will not contribute to the first echo. However, a second refocus pulse will recall some of the magnetization from the z-direction into the x-y plane and will create a first "stimulated echo." Simultaneously, the second refocus pulse will also refocus the de-phased first direct echo and a second direct echo will be created.

The refocus pulses restore only the transversal magnetization that gets lost due to the inhomogeneity of the $B_0$ field. The loss of magnetization due to relaxation processes cannot be restored and will happen with the time constant $T_2$ (with a contribution of $T_1$ due to the stimulated echo contributions).

The longitudinal relaxation time $T_1$ of a fluid in a porous rock can be expressed as:

$$\frac{1}{T_1} = \frac{1}{T_{1B}} + \frac{1}{T_{1S}}, \qquad (1)$$

where $T_{1B}$ is the $T_1$ from the "bulk fluid relaxation", and $T_{1S}$ is $T_1$ from "surface relaxation". If the fluid is not wetting the surface (e.g., a hydrocarbon in a water wetting formation), then, $T_1 \approx T_{1B}$, and $T_1$ can be used to estimate the viscosity. If the fluid is wetting the surface, then, the surface relaxation is usually dominant, and the $T_1$ can be used to estimate the pore radius.

The overall $T_1$ value is different for different types of fluids. For example, water has a lower $T_1$ time than oil, and oil has a lower $T_1$ than gas. As described herein, $T_1$ values may be classified as short, which correspond to the $T_1$ of bound water and/or heavy oil, medium (corresponding to moveable water or free fluid), and long (corresponding to light oil and gas).

As described herein, "$T_{1\lambda}$" is the $T_1$ value of a long-$T_1$ fluid that includes light hydrocarbons. Light hydrocarbon fluid may include both light oil and gas. $T_{1\lambda}$ distributions or values are calculated as described herein and utilize to differentiate between oil and light gas in light hydrocarbon fluid.

$T_{1\lambda}$ can be measured by using a dual-wait time acquisition as described further below, and may be used to identify constituents of light hydrocarbons identified via $T_2$ measurements. In one embodiment, $T_{1\lambda}$ is estimated as described herein based on light hydrocarbon $T_2$ volumetrics and used to differentiate between gas and light oil. As described herein, "gas" refers to natural gas or other hydrocarbons typically referred to as gas in the energy industry. As described herein, "light oil" refers to light crude oil as known in the energy industry, which typically has a low density and flows freely at room temperature. Light oil can be generally classified as a hydrocarbon having an American Petroleum Institute (API) gravity that is greater than 31.1°.

The apparent $T_2$ decay, or $T_2$ under gradient field conditions, can be written as:

$$\frac{1}{T_{2A}} = \frac{1}{T_{2B}} + \frac{1}{T_{2S}} + \frac{1}{T_{2D}}, \qquad (2)$$

where "$T_{2A}$" is a number or value representing a $T_2$ distribution, such a geometric mean of the $T_2$ values in the $T_2$ distribution. $T_A$ may be any suitable value, such as a statistical value or value derived from a mathematical operation performed on values of the $T_2$ distribution, which can be used to characterize the $T_2$ distribution. "$T_{2B}$" is the $T_2$ caused by "bulk fluid relaxation", "$T_{2S}$" is $T_2$ caused by "surface relaxation", and "$T_{2D}$" is the relaxation time caused by the fluid diffusivity. $T_B$ and $T_S$ depend only on fluid and formation properties, while $T_{2D}$ depends not only on formation properties (diffusivity "D", and field gradient caused by magnetic minerals) but also on tool design (magnetic field gradient of the tool) and acquisition design (inter-echo time "$t_E$").

The relaxation caused by bulk fluid $T_{2B}$ and $T_{2S}$ is referred to as the intrinsic $T_2$ relaxation "$T_{2I}$". Thus, $T_{2A}$ can be represented by:

$$\frac{1}{T_{2A}} = \frac{1}{T_{2I}} + \frac{1}{T_{2D}}. \qquad (3)$$

The diffusion term $T_{2D}$ can be expressed as:

$$\frac{1}{T_D} = \frac{D_A \cdot (\gamma \cdot G \cdot t_E)^2}{12}, \qquad (4)$$

where "$D_A$" is the apparent diffusivity, "G" is a value of the magnetic field gradient, which may include the combined effect of the magnetic field gradient caused by the NMR tool and the magnetic field gradient caused by magnetic minerals in the formation. "$\gamma$" is the gyromagnetic ratio.

When the $T_2$ measurement is performed with an NMR logging tool, then the apparent T2 ($T_{2A}$) corresponds to the measured $T_2$, referred to herein as "$T_{2M}$". If the NMR logging tool is moving and/or rotating, then $T_{2M}$ is altered by the axial motion effect and/or the lateral motion effect, and the $T_1$. The dependency of the measured $T_{2M}$ on $T_1$ is caused by the stimulated echoes which partially relax in the longitudinal direction. The axial motion effect is a shift in $T_{2M}$ measurements due to axial motion of an NMR tool. Axial motion as described herein refers to motion along the longitudinal axis of the tool or borehole string, and is typically quantified as logging speed or speed of the tool along the borehole (e.g., rate of penetration (ROP) while drilling or tripping, also known as tripping speed), as opposed to axial vibrations. The lateral motion effect is a shift in $T_{2M}$ measurements due to lateral vibrations or other tool motions in a lateral direction having a component that is perpendicular to the longitudinal tool axis. An example of lateral motion is lateral vibrations occurring due to tool rotation.

For a long-$T_1$ fluid or light hydrocarbon, the $T_2$ dependency on $T_1$ is small. Thus $T_{2A}$ can be represented by:

$$T_{2A} \approx T_{2MFL}, \quad (5)$$

where $T_{2MFL}$ is the measured $T_2$ ($T_{2M}$) corrected for the flow or axial-motion effect (denoted by subscript F) and the lateral-motion effect (denoted by subscript L).

In one embodiment, the magnetic resonance measurements are performed by a low gradient magnetic resonance tool. NMR tools and methods can be classified according to the strength of the static magnetic field gradient. An example of a low gradient NMR tool is the MagTrak tool by Baker Hughes, Inc., which can be distinguished from high gradient tools such as the MR eXplorer™ (MReX™) tool by Baker Hughes, Inc.

A low gradient NMR tool generates a static magnetic field that has a gradient that is sufficiently low so that the apparent $T_1$ is similar to the apparent $T_2$. Such low gradient fields are much less sensitive to the molecular diffusion than typical high gradient fields. Thus, the diffusion term is relatively low compared to that of high gradient fields, but is not non-existent. Although the diffusion term is low, it has sufficient magnitude to allow being used to differentiate between gas and light oil. An exemplary static magnetic field for a low gradient tool is less than or equal to about 10 G/cm (Gauss per centimeter). In another example, a low gradient tool is less than or equal to about 5 G/cm.

For a low gradient tool, $T_{2D}$ is typically considerably larger than $T_2$ and the recorded $T_2$ distribution is usually quite similar to the apparent $T_1$ distribution. The $T_1/T_2$ ratio is usually between 1 and 3. However, in the presence of iron minerals the internal field gradients increase significantly, which in turn enhances the $T_2$ diffusion decay, i.e. $T_{2D}$ decreases, and $T_2$ gets smaller.

High gradient tools are very sensitive to lateral motion, and thus are generally limited with respect to acquiring $T_1$ data in LWD applications. In contrast, low gradient tools can be used in LWD and other operations to acquire $T_2$, $T_1$ or both $T_2$ and $T_1$ simultaneously. Low gradient tools generally have a small sensitivity to lateral motion, and are thus primarily affected by axial motion. Although axial motion affects are small, they can be significant especially for long $T_1$ fluids and result in porosity overcall in long $T_1$ fluids and a shift in long $T_2$ components to lower $T_2$ values.

Systems, apparatuses and/or processors described herein are configured to perform various functions including performing NMR measurements and/or estimating properties of formations and formation fluids. In one embodiment, a processor is configured to receive and analyze NMR measurements taken by a low gradient NMR tool to derive information about formation fluids, such as whether light oil and/or gas is present in a formation, and characteristics (e.g., partial porosity) of light oil and/or gas. Other information includes fluid properties such as hydrogen index (HI), diffusivity (D), ratio of $T_1/T_2$, and the $T_2$ distribution. The processor acquires measurement data from a dual wait time (DTW) measurement, determines properties such as the $T_2$ distribution, and estimated $T_{1\lambda}$ based on the $T_2$ distribution. Based on the estimated $T_{1\lambda}$, light hydrocarbon fluids can be differentiated between gas and light oil constituents.

Figure 2:
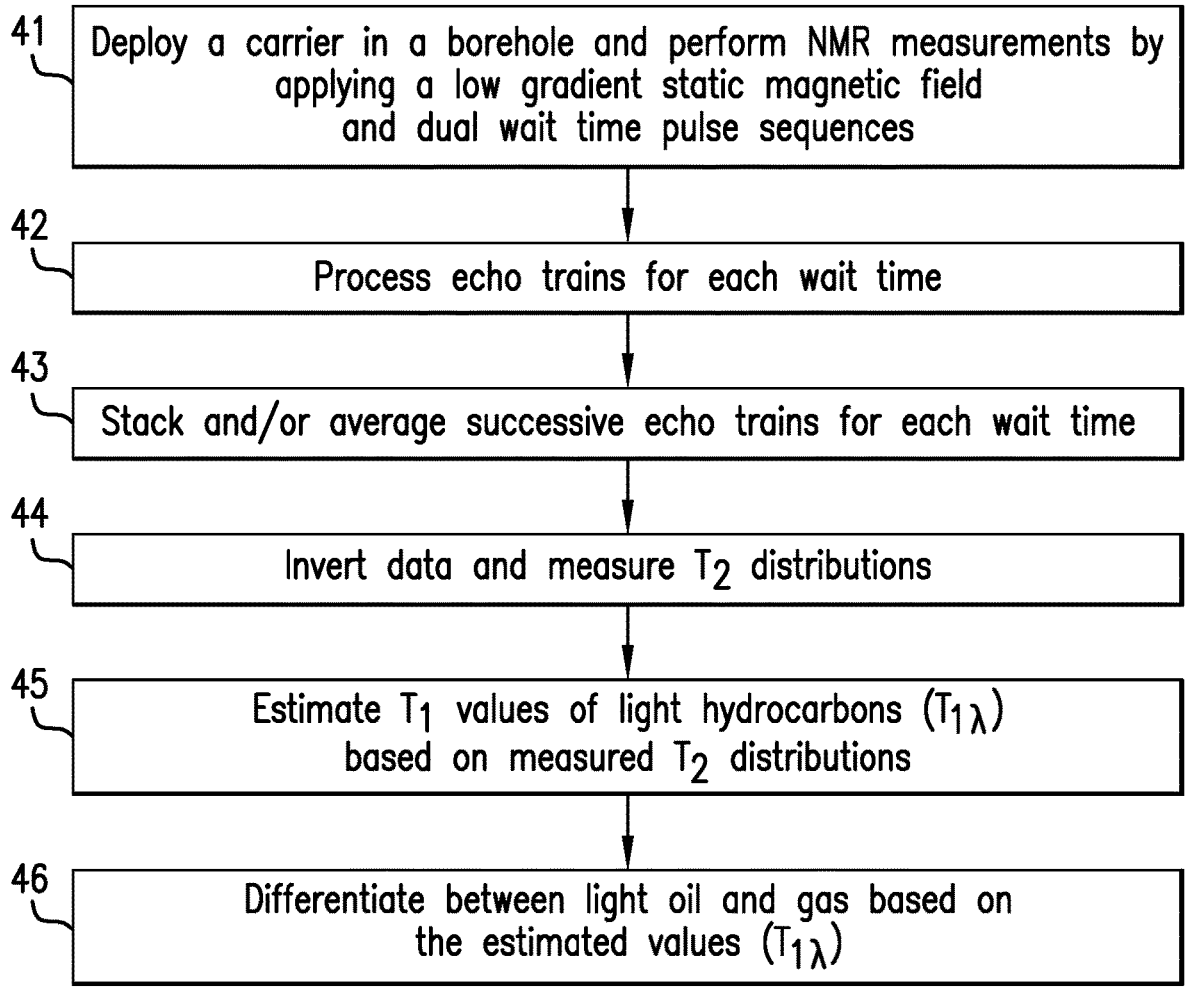
FIG. 2 is a flow chart that depicts an embodiment of a NMR measurement method that includes estimating $T_1$ values using dual wait time pulse sequences and differentiating between gas and light oil in a formation.

FIG. 2 illustrates a method 40 for performing an NMR measurement operation that includes analyzing DTW measurement data using a low gradient NMR measurement to differentiate between gas and light oil in a formation or hydrocarbon reservoir. The method 40 may be performed in conjunction with the system 10, but is not limited thereto. The method 40 includes one or more of stages 41-46 described herein, at least portions of which may be performed by a processor (e.g., the surface processing unit 28). In one embodiment, the method 40 includes the execution of all of stages 41-46 in the order described. However, certain stages 41-46 may be omitted, stages may be added, or the order of the stages may be changed.

In the first stage 41, a low gradient NMR measurement device or tool is deployed into a borehole. In one embodiment, the tool (e.g., the tool 14) is deployed as part of a wireline operation, or during drilling as part of a LWD operation.

Measurements are performed by generating a low gradient static magnetic field $B_0$ in a volume of interest in the formation, and transmitting a pulsed signal from at least one transmitting antenna according to at least two different pulse sequences, which in turn generate an oscillating magnetic field $B_1$ in the volume of interest.

At least one receiving antenna detects NMR signals from the volume of interest in response to the interaction between the nuclear spins and the static and oscillating magnetic fields, and generates raw NMR data. The raw NMR data includes spin echo trains that may be measured at a plurality of depths. In one embodiment, the pulse sequences are CPMG pulse sequences. The NMR measurements may be performed while the NMR tool is stationary, or while the NMR tool is in motion. For example, NMR measurements are performed during a LWD operation, during which the NMR tool is moved laterally and/or is rotating. Alternatively, the NMR measurements are performed in LWD operations while the NMR tool is at least substantially stationary (axially and/or rotationally). For example, NMR measurements are performed during intermittent penetration breaks during which the NMR tool is held stationary to avoid, minimize, or reduce motion effects. In another example, NMR measurements are performed during a wireline operation during which the NMR tool is either advanced along a borehole or held stationary during the measurements.

Output from each measurement is detected as time domain amplitude measurements generated by each pulse sequence. The time domain amplitude values for a pulse sequence is referred to as an echo train, in which the echo amplitude decreases exponentially with the time constant $T_2$ or a distribution of time constants $T_2$ that may be described by a characteristic number such as but not limited to the arithmetic mean, the harmonic mean, the geometric mean, or the log-mean.

In one embodiment, the measurements are performed by emitting a plurality of pulse sequences that includes at least two sequences, each having a different wait time ("TW"). The at least two sequences in this embodiment are referred to as dual wait time ("DTW") sequences. The DTW sequences include a first sequence having a relatively long wait time and a second sequence having a relatively short wait time. The first sequence is referred to as a "long-TW sequence" having a long wait time ($TW_L$), and the second sequence is referred to as a "short-TW sequence" (e.g., a having a short wait time (TWs) relative to the first sequence.

The wait times may be selected based on the $T_1$ time for a given volumetric component (or simply volumetric) of the volume of interest, i.e., the time needed to polarize a fluid or formation material. Examples of volumetrics include heavy oil, light hydrocarbons (e.g., gas and/or light oil), free fluid, moveable water, bound fluids, clay bound water and capillary bound water.

In one embodiment, the long wait time $TW_L$ is selected based on the longitudinal relaxation time for light hydrocarbons. For example, $TW_L$ may be selected based on the relationship $TW_L>3*T_{1,LHC}$, where $T_{1,LHC}$ is the log-mean (or geometric mean) $T_1$ for a light hydrocarbon (e.g., gas and/or light oil) volumetric. As another example, $TW_S$ may be selected based on the relationship $TW_S>3*T_{1,MW}$, where $T_{1,MW}$ is the log-mean (or geometric mean) $T_1$ for a movable water volumetric. Various other rules may be used for selection of the relative wait times for the $TW_L$ sequence and the TWs sequence. Any suitable criteria may be used to select the relative wait times, such as the desired resolution (e.g., vertical resolution) and motion characteristics (e.g., lateral motion frequency).

In one embodiment, at least one sequence is configured as a phase-alternate pair (PAP) sequence pattern. A PAP sequence pattern includes two consecutively recorded sequences, where the phase of the tipping pulse of the second sequence in the pair being reversed relative to the phase of the tipping pulse of the first sequence in the pair. The echoes of the two consecutive sequences are subtracted to eliminate ringing and offset. In this embodiment, the $TW_L$ sequence includes a phase alternating paired (PAPed) sequence, and the $TW_S$ sequence includes a PAPed sequences.

The DTW measurement may also include a clay bound water (CBW) measurement which includes one or more CBW sequences. A CBW sequence is a sequence having a wait time corresponding to the T1 value for clay bound water.

For example, a long measurement is performed by detecting echo trains from a $TW_L$ sequence having a wait time corresponding to the known or expected $T_1$ value or $T_1$ value range of light hydrocarbons, and a short measurement is performed by detecting echo trains from a $TW_S$ sequence. Optionally, an additional measurement is performed using a CBW sequence having a wait time that is shorter than both the long and short wait times. If PAPs are used, the $TW_L$ sequence may include one PAP or multiple PAPs, and the $TW_S$ sequence and the CBW sequence may include multiple PAPs.

In the second stage 42, measured data including raw echo trains are processed, e.g., to remove noise and improve analysis. For example, processing includes an optional despiking (spike noise removal) of the measured data. Another example of processing includes calibration to correlate data values with fluid and/or formation property values. For example, the measured data (spin echo trains) is multiplied by a calibration factor to account for, e.g., different amplifiers. As a result of the calibration arbitrary units are transformed into porosity units. Other processing techniques include, for example, filtering, and phase rotating the data into a "signal channel".

An optional outflow correction may be applied to the processed NMR data to correct for the axial-motion effect. In one embodiment, an "outflow correction" corresponds to the "motion correction A" described in U.S. Pat. No. 7,358,725, which is incorporated herein by reference in its entirety. The outflow correction might be due to axial and/or radial movement of the tool. In one embodiment, the outflow correction can be applied on phase rotated PAPed echo trains. Alternatively the order of this stage 42 and of the next stage 43 ("stack and average echo trains") might be interchanged and the outflow correction would be applied on the stacked and averaged echo trains.

In the third stage 43, in one embodiment, the first measurement includes a first plurality of successive echo trains detected from a plurality of successive pulse sequences having the first wait time, and the second measurement includes a second plurality of successive pulse sequences having the second wait time. The processor is configured to stack and average at least a part of the first plurality of successive echo trains to generate the long wait-time echo train, and stack and average at least a part of the second plurality of successive echo trains to generate the short wait-time echo train.

Figure 3:
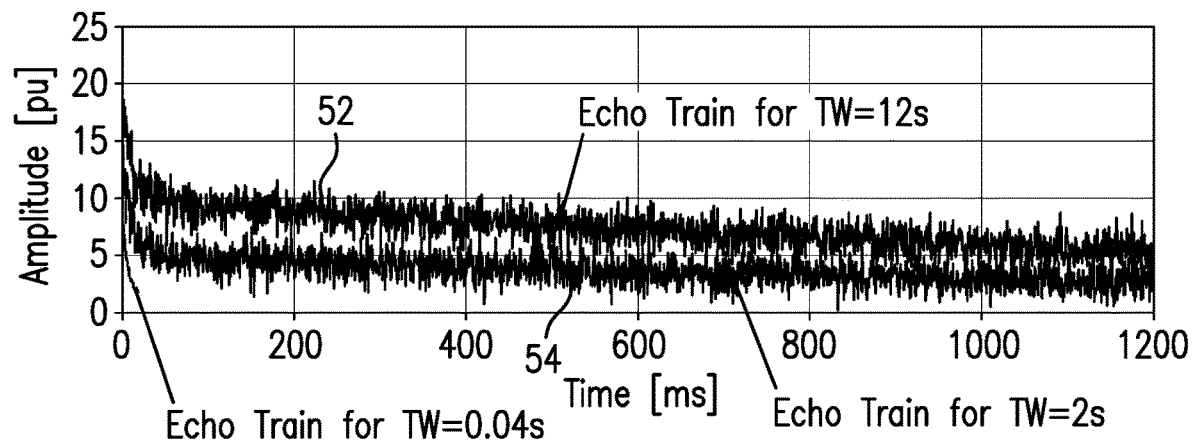
FIG. 3 depicts an example of echo trains generated by dual wait time pulse sequences.

For example, successive echo trains received during NMR measurements are stacked and/or averaged in a "running average" fashion to improve the signal-to-noise ratio. Multiple $TW_L$ sequences are generated and a running average of the echo trains detected from each $TW_L$ sequence is calculated to produce a combined echo train. Likewise, multiple $TW_S$ sequences are generated and a running average of the echo trains detected from each $TW_S$ sequence is calculated to produce a combined echo train. FIG. 3 shows an example of two simulated combined or stacked echo trains 52, 54. Echo train 52 is for a $TW_L$ of 12 seconds and train 54 is for a $TW_S$ of 2 seconds.

In the fourth stage 44, the echo train data is inverted or otherwise transformed from the time domain (echo train data) into the $T_2$ domain ($T_2$ distribution). The output of such a transformation or inversion yields two $T_{2A}$ distributions: a first $T_{2A}$ distribution for the $TW_L$ sequence and a second $T_{2A}$ distribution for the $TW_S$ sequence. One or more cutoffs (i.e., time values) may be selected to separate the $T_{2A}$ distribution into different volumetrics.

Figure 4:
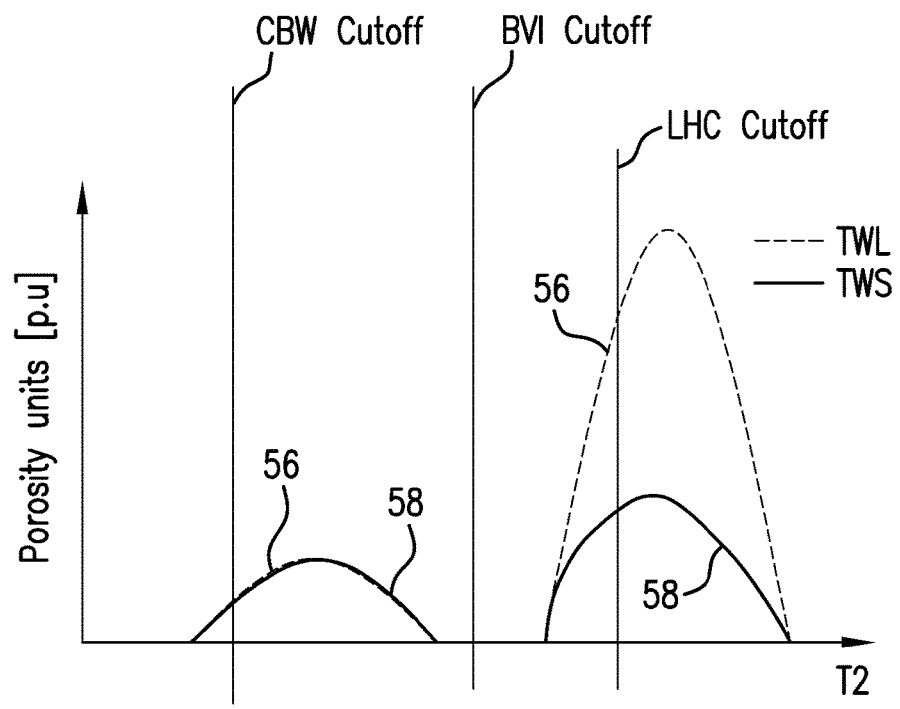
FIG. 4 depicts an example of $T_2$ distribution curves calculated by inverting echo trains generated by dual wait time pulse sequences.

An example of respective $T_{2A}$ distributions calculated based on the $TW_L$ sequence and the $TW_S$ sequence is shown in FIG. 4. In this example, the $T_{2A}$ distribution for TWL is represented by a curve 56, and the $T_{2A}$ distribution for TWS is represented by a curve 58. The area under each curve may be associated with all or part of the total porosity of the volume of interest, which can be divided by cutoffs to define partial porosities of different volumetrics. FIG. 4 shows examples of cutoffs used to define partial porosities for or volumes of the total volume of interest associated with different volumetrics.

For example, two cutoffs split the $T_{2A}$ distribution into three volumetrics: Clay Bound Water (CBW), Capillary Bound Water (BW) and Free Fluid (FF). The cutoff between CBW and BW is called CBW cutoff and is typically in the range of 3.3 ms. The cutoff between BW and FF is called BVI (bulk volume irreducible) cutoff or CBVI. In one embodiment, CBVI is determined in laboratory with NMR measurements on core samples. In the absence of laboratory data, default values based on lithology may be used. For example, a CBVI of 33 ms may be used for sandstones and 92 ms may be used for carbonates. For example, if the CBVI cutoff is assumed to be 100 ms, the FF partial porosity $FF_{TWL}$ would be the area in the $T_{2A}$ distribution delimited by curve 56 at $T_2>100$ ms; $FF_{TWS}$ would be the area in the $T_{2A}$ distribution delimited by curve 58 at T2>100 ms.

For determination of $T_1$ as described further herein, the echo trains or the respective $T_{2A}$ distributions may be combined to produce a single or combined $T_{2A}$ distribution. Echo train subtraction may be performed to generate an echo train representing measurements from both wait times. For example, an echo train or averaged echo train for the short wait time (e.g., echo train 54) is subtracted from an echo train or averaged echo train for the long wait time (e.g., echo train 52) to generate a combined or differential echo train that is then inverted to generate a combined $T_{2A}$ distribution. Alternatively, the difference between the first $T_{2A}$ distribution (for the $TW_L$ sequence) and the second $T_{2A}$ distribution (for the $TW_S$ sequence) may be calculated to generate a combined or differential $T_{2A}$ distribution. As described herein, a "$T_2$ value" or "$T_2$ distribution" may refer to either individual $T_2$ distributions or values, or to combined $T_2$ distributions or values. For apparent or measured $T_2$, "$T_{2A}$ value" or "$T_{2A}$ distribution" may refer to either individual $T_{2A}$ distributions or values, or to combined $T_{2A}$ distributions or values.

In the fifth stage 45, the $T_{1\lambda}$ distribution is estimated based on the $T_{2A}$ distribution using any suitable technique. For example, $T_{1\lambda}$ is estimated by multiplying $T_{2A}$ by a selected value R.

In one embodiment, $T_{1\lambda}$ is estimated by calculating a FF amplitude ratio ($R_{TW,FF}$). Assuming only one distinctive peak in the inverted data, this process may include solving the amplitude ratio:

$$R_{TW,FF} = \frac{FF_{TWS}}{FF_{TWL}} \quad (6)$$

In some cases two different formation fluids contribute to the FF porosity. In water wet reservoirs, the movable water has a lower $T_2$ value than the light hydrocarbons (gas or light oil) or the water in vuggy porosity. In the presence of more than one fluid, the FF volumetric may be split into two volumetrics such as a movable water (MW) volumetric (includes "medium oil") and a light hydrocarbon (LHC) volumetric. For example, the curves shown in FIG. 4 are divided by a LHC cutoff that splits the FF volumetric into MW and LHC volumetrics.

If two peaks are observable in the FF $T_2$ domain, then the cutoff ("light HC cutoff") may be the trough between the two peaks. This cutoff might be variable or fixed and it might be set by a human processor or by a software algorithm. If two distinctive peaks are present in the FF domain, then two amplitude ratios might be calculated:

$$R_{TW,MW} = \frac{MW_{TWS}}{MW_{TWL}}; \text{ and} \quad (7)$$

$$R_{TW,LHC} = \frac{LHC_{TWS}}{LHC_{TWL}}. \quad (8)$$

$R_{TW,MW}$ is the amplitude ratio for the MW domain and $T_{RW,LHC}$ is the amplitude ratio for the LHC domain. In most cases $R_{TW,MW}$ should be close to 1 and a polarization correction is not necessarily required. Herein, $R_{TW}$ may be used as a synonym for $R_{TW,FF}$ or $R_{TW,LHC}$.

In one embodiment, the $T_1$ of the light hydrocarbon volumetric (which may include light oil and/or gas), referred to herein as $T_{1\lambda}$, is calculated based on the $T_{2A}$ distribution. In one embodiment, $T_{1\lambda}$ is calculated using the amplitude ratio $R_{TW,FF}$ or $R_{TW,LHC}$ discussed above. The $T_{1\lambda}$ to is then used to differentiate between oil and gas, e.g., to identify whether the light hydrocarbon volumetric includes gas and/or determine the relative partial porosities of gas and light oil. The $T_{1\lambda}$ can also be used to estimate the viscosity and/or to estimate the hydrocarbon index "HI" (which is needed for HI correction).

In some cases, such as during LWD operations, the speed of the NMR tool along a borehole during NMR data acquisition is greater than zero or greater than low values, $T_1$ generally and more specifically $T_{1\lambda}$ may be calculated as a function of speed and other variables. Descriptions herein related to the speed of the tool are provided in the context of rate of penetration (ROP), however it is understood that such descriptions may also be applicable to any axial movement of a tool (e.g., tripping speed). In one embodiment, $T_1$ and/or $T_{1\lambda}$ is estimated as discussed further below as a function of $R_{FF}$, ROP, $TW_L$, $TW_S$, $B_0$, and a saturation sequence (if applicable).

In one embodiment, the inversion is performed as discussed above on averaged echo-trains (RA is the number of averaged echo trains). Because the ROP may not be constant during NMR measurement, two approaches may be used to handle time varying ROP. First, assume an averaged echo train was built by averaging RA echo trains and let $ROP_i$ be the ROP at which the $i^{th}$ echo train ($1 \le i \le RA$) was recorded.

One approach to performing the processing includes calculating polarization using an averaged $ROP_{av}$. A further explanation of how this may be accomplished is provided in U.S. Pat. No. 7,358,725, which is incorporated herein by reference. $ROP_{av}$ is computed with the formula:

$$ROP_{av} = \frac{\sum_{i=1}^{RA} ROP_i}{RA}. \quad (9)$$

Figure 5:
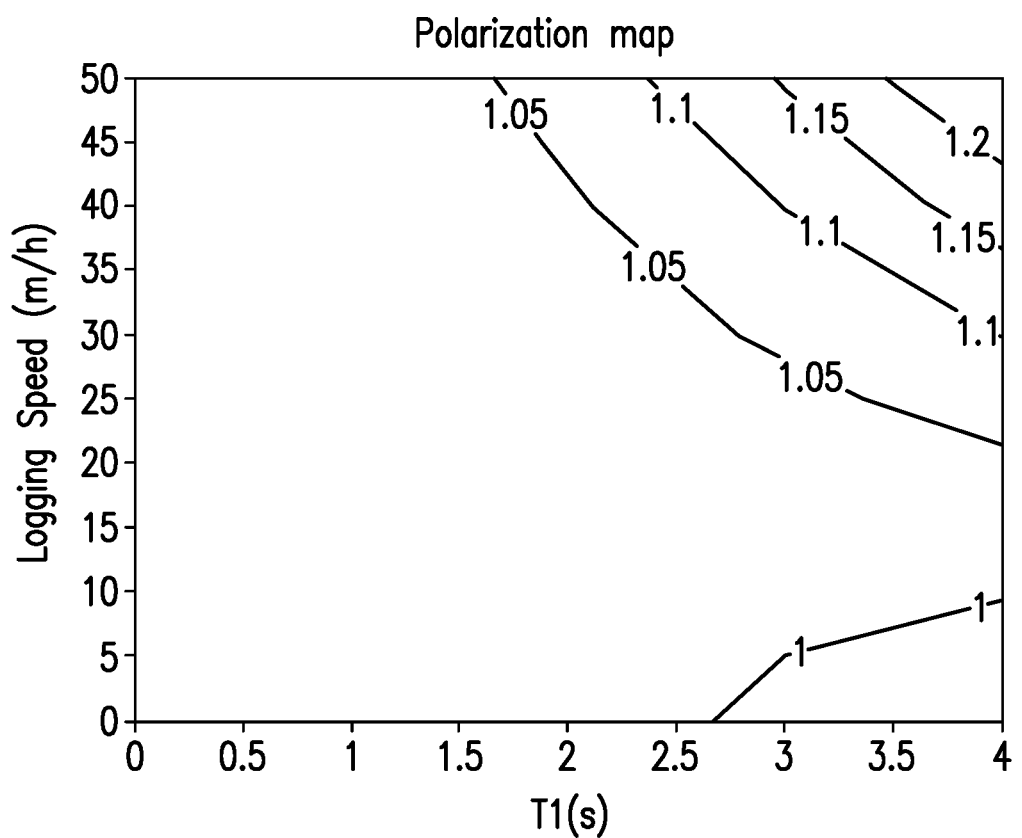
FIG. 5 depicts an example of a polarization map describing polarization as a function of rate of penetration and T1.

$T_1$ and/or $T_{1\lambda}$ is then calculated as function of $R_{TW}$, $TW_L$, $TW_S$, $ROP_{av}$, $B_0$, and saturation sequence using, for example, a polarization map as shown in FIG. 5 and further discussed below. The polarization map may be determined by modeling. In one embodiment, $T_{1\lambda}$ is estimated as described in "Improved NMR Logging Approach to Simultaneously Determine Porosity, T2 and T1," SPE-175050-MS, Society of Petroleum Engineers (SPE) Annual Technical Conference and Exhibition, 28-30 Sep. 2015, the entire contents of which are incorporated by reference herein.

In a second approach, polarization curves are computed for each TW ($TW_L$ and TWs) and for each $ROP_i$ (at given $B_0$) for a given $T_1$ range. Average polarization curves are computed for $TW_L$ and $TW_S$ ($TW_{Lav}$ and $TW_{Sav}$) by using the computed polarization curves (for the given $T_1$ range). The FF amplitude ratio is computed using the average polarization curves (for the given $T_1$ range), and $T_1$ and/or $T_{1\lambda}$ is computed by using the data computed at the previous step and the measured amplitude ratio, $R_{TW}$.

The polarization of FF in the volume of interest is estimated based on $T_1$ values associated with the FF. In one embodiment, the polarization is calculated using a known $T_1$ (e.g., the $T_{1\lambda}$ as calculated in stage 45) based on the following formula:

$$P_{TW} = 1 - e^{-\frac{TW}{T1}}, \quad (10)$$

where $P_{TW}$ is the polarization after a wait time TW. However, the polarization depends also on ROP and on the $B_0$ field distribution. Therefore, a more accurate approach would be considering also these dependencies in the computation of $P_{TW}$ (as discussed above and in U.S. Pat. No. 7,358,725). The computation can be done in advance and saved as a map, such as the map of FIG. 5, which shows the polarization of FF based on a wait time of 18 seconds, as a function of ROP and $T_1$.

Polarization correction may be optionally performed. Typically, for a sufficiently long $T_W$ (e.g., TW>3*T1 of the free fluid) the polarization correction is considered to be low and no correction may be applied. In this case:

$$FF\_P = FF_{TWL}, \quad (11)$$

where FF_P is the polarization corrected free fluid porosity and $FF_{TWL}$ is the uncorrected FF measured with the long wait time.

However, as FIG. 5 illustrates, the assumption that the polarization is close to 1 may not be accurate. In such cases, the polarization correction can be applied on data recorded with the long wait time:

$$FF\_P = \frac{FF_{TWL}}{P_{TWL}} \qquad (12)$$

Where $P_{TWL}$ is the polarization after a long wait time $TW_L$, or the polarization correction considers also the data recorded with the short wait time $TW_S$. The generic formula would then be:

$$FF\_P = \frac{w_L \frac{FF_{TWL}}{P_{TWL}} + w_S \frac{FF_{TWS}}{P_{TWS}}}{w_L + w_S}, \qquad (13)$$

where $w_L$ and $w_S$ are the weights used in this weighted average. There are several approaches to choose these weights. One approach would be to choose the weight proportional to the signal-to-noise ratio of the respective measurements.

Lateral motion correction may also be applied to compensate for shifts in NMR data that result from lateral motion. NMR simulations have shown that lateral motion typically leads to a shift of partial porosity from the free fluid domain into the bound water domain. Correction for lateral motion may be performed, for example, by identifying motion artifacts and removing such artifacts according to techniques such as those described in U.S. patent application Ser. No. 14/190,337, filed on Feb. 26, 2014 and published as U.S. Publication No. 2015/0241541, the contents of which are incorporated by reference herein in their entirety.

Various approaches may be used to identify gas and/or differentiate between gas and light oil using the estimate $T_{1\lambda}$. In each of the following examples, flow correction based on ROP or logging speed may be used where desired, e.g., for NMR logging while drilling or NMR logging using a moving wireline or other tool. In addition, each of the following approaches may incorporate lateral motion correction as discussed above.

In one example, gas and light oil are differentiated based on the apparent diffusivity values calculated using the estimated $T_{1\lambda}$ for the light hydrocarbon volumetric. As discussed above, a dual-wait time NMR measurement (or a multiple-wait time NMR measurement) is used to generate a $T_{2A}$ distribution and measure $T_{1\lambda}$ of the light oil or gas. Flow correction and/or lateral motion correction may be applied if needed or desired to correct the $T_{2A}$ distribution. $T_{2A}$ can be also measured by a stationary measurement. If a stationary measurement is performed, there is no need for flow correction, and if a stationary measurement is performed without rotation, then there is also no need for lateral-motion correction. $T_{2A}$ from a stationary measurement can be also used to calibrate $T_{2MFL}$.

The apparent diffusivity $D_A$ is then computed using $T_{2A}$ and $T_{1\lambda}$. For example, the intrinsic $T_2$ ($T_{21}$) may be assumed to be approximately equal to $T_{1\lambda}$:

$$T_{21} \approx T_{1\lambda}.$$

The solution for $D_A$ can then be derived from the equations discussed above. For example, $D_A$ can be calculated based on $T_{2A}$ and $T_{1\lambda}$ using the following relationship:

$$\frac{1}{T_{2A}} = \frac{1}{T_{1\lambda}} + \frac{D_A \cdot (\gamma \cdot G \cdot t_E)^2}{12}. \qquad (14)$$

The apparent diffusivity is then used to separate between light oil and gas. The apparent diffusivity $D_A$ may be compared to known diffusion coefficients for gas and light oil to identify whether gas is present and/or the relative volumetric fractions of gas and light oil. For example, the apparent diffusivity is compared to known diffusivity values for light oil and gas as a function of pressure and temperature. In another example, a threshold value for the apparent diffusivity is selected to indicate whether the light hydrocarbon fluid is gas or light oil.

If the light hydrocarbon fluid is light oil, and one or more properties (e.g., API gravity, density, viscosity) of the dead oil and the downhole pressure and temperature are known, then $T_{1\lambda}$ can be directly mapped to a hydrogen index (HI) value and/or to a gas/oil ratio (GOR). If the light hydrocarbon fluid is gas, and the downhole pressure and temperature are known, then $T_{1\lambda}$ can be directly mapped to a HI. HI correction may then be applied to partial porosity estimates of the gas and/or light oil identified. Various methods can be used to estimate HI, such as methods that use estimates of HI of light oil and gas can from offset wells and methods that use gas detected in mud logging.

Another example utilizes a similar approach to the approach using diffusivity. However, in this example a ratio of the estimated $T_{1\lambda}$ and apparent $T_{2A}$ is calculated, i.e., a $T_{1\lambda}/T_{2A}$ ratio, referred to as $R_{T\lambda}$. A DTW measurement is performed, and optional flow and/or lateral motion corrections are applied. Values of the $R_{T\lambda}$ can be compared to known or expected values (e.g., calculated based on similar formations for which fluid composition is known) to identify whether fluid is light oil or gas. HI may be estimated as discussed above and a HI correction may be applied.

In another example, the estimated $T_{1\lambda}$ is calculated in conjunction with surface logging. Surface logging is used to separate between gas and light oil. $T_{1\lambda}$ is used to estimate HI, and HI correction is applied. The above examples can be combined to improve the accuracy and/or robustness of results. For example, differentiation between gas and light oil can be performed using diffusivity and also be performed using $R_{T\lambda}$, and results compared to increase the accuracy of the overall results.

The apparatuses, systems and methods described herein provide numerous advantages. The use of low gradient NMR in conjunction with dual wait times allow for effective measurement of $T_1$ and $T_2$ values (including simultaneous $T_1$ and $T_2$ measurements) in formations or reservoirs that include light hydrocarbons, which is otherwise not available with high-gradient tools. Furthermore, gas and light oil can be differentiated using only the low gradient NMR measurements without necessitating additional types of measurements Set forth below are some embodiments of the foregoing disclosure:

Embodiment 1

A method of performing a nuclear magnetic resonance (NMR) measurement, the method comprising: disposing a NMR measurement device in a carrier in an earth formation, the NMR measurement device including a magnetic field source and a transmitting assembly; applying a static magnetic field into a formation by the magnetic field source, and emitting a plurality of pulse sequences by the transmitting assembly into the formation, the plurality of pulse sequences including at least a first pulse sequence having a first wait time and a second pulse sequence having a second wait time; receiving NMR measurement data including a long wait-time echo train and a short wait-time echo train, the long wait-time echo train based on the first pulse sequence and the short wait-time echo train based on the second pulse sequence; transforming, by a processor, the echo trains into volumetric portions including a first fluid volumetric portion; estimating a longitudinal relaxation time for the first fluid volumetric portion; and identifying whether the first fluid volumetric portion is gas or light oil based on the estimated longitudinal relaxation time.

Embodiment 2

The method of embodiment 1 wherein the static magnetic field has a gradient that is less than about 10 Gauss/cm.

Embodiment 3

The method of embodiment 2, wherein the first fluid is a light hydrocarbon.

Embodiment 4

The method of embodiment 3, wherein transforming the echo trains includes inverting the echo trains into a T2 distribution.

Embodiment 5

The method of embodiment 4, wherein the first wait time is selected to be greater than a longitudinal relaxation time associated with a light hydrocarbon.

Embodiment 6

The method of embodiment 2, further comprising moving the NMR measurement device axially along a borehole in the earth formation during application of the static magnetic field, emission of the plurality of pulse sequences and receipt of the NMR measurement data.

Embodiment 7

The method of embodiment 2, further comprising applying the static magnetic field to the formation, emitting the plurality of pulse sequences, and receiving the NMR measurement while the NMR measurement device is substantially stationary within the borehole.

Embodiment 8

The method of embodiment 5, wherein identifying whether the light hydrocarbon volumetric portion is gas or light oil includes calculating an apparent diffusivity value based on the estimated longitudinal relaxation time and the T2 distribution, and determining whether the light hydrocarbon volumetric portion is gas or light oil based on the apparent diffusivity value.

Embodiment 9

The method of embodiment 5, wherein identifying whether the light hydrocarbon volumetric portion is gas or light oil is based on mud logging data.

Embodiment 10

The method of embodiment 4, wherein transforming the echo trains includes correcting the T2 distribution for at least one of an axial motion of the NMR measurement device, and a lateral motion of the NMR measurement device.

Embodiment 11

The method of embodiment 5, wherein identifying whether the light hydrocarbon volumetric portion is gas or light oil includes calculating a ratio between the estimated longitudinal relaxation time and a T2 value derived from the T2 distribution, and determining whether the light hydrocarbon volumetric portion is gas or light oil based on the ratio.

Embodiment 12

The method of embodiment 5, further comprising determining at least one of a hydrogen index and a viscosity of the light hydrocarbon volumetric based on the estimated longitudinal relaxation time.

Embodiment 13

The method of embodiment 8, further comprising calculating a hydrogen index of the volumetric based on the estimated apparent diffusivity, from offset wells, or from mud logging data.

Embodiment 14

The method of embodiment 2, further comprising calculating the hydrogen index of the first fluid volumetric based on the estimated longitudinal relaxation time.

Embodiment 15

A nuclear magnetic resonance (NMR) apparatus for estimating properties of an earth formation, the apparatus comprising: an NMR measurement device configured to be disposed in a carrier in an earth formation, the NMR measurement device including a magnetic field source and a transmitting assembly, the magnetic field source configured to apply a static magnetic field into a formation, the transmitting assembly configured to emit a plurality of pulse sequences into the formation, the plurality of pulse sequences including at least a first pulse sequence having a first wait time and a second pulse sequence having a second wait time; a processor configured to receive NMR measurement data including a long wait-time echo train and a short wait-time echo train, the long wait-time echo train based on the first pulse sequence and the short wait-time echo train based on the second pulse sequence, the processor configured to perform: transforming the echo trains into volumetric portions including a first fluid volumetric portion; estimating a longitudinal relaxation time for the first fluid volumetric portion; and identifying whether the first fluid volumetric portion is gas or light oil based on the estimated longitudinal relaxation time.

Embodiment 16

The apparatus of embodiment 15, wherein the static magnetic field has a gradient that is less than about 10 Gauss/cm.

Embodiment 17

The apparatus of embodiment 16, wherein the first fluid is a light hydrocarbon

Embodiment 18

The apparatus of embodiment 17, wherein transforming the echo trains comprises an inverting the echo trains into a T2 distribution

Embodiment 19

The apparatus of embodiment 18, wherein the first wait time is selected to be greater than a longitudinal relaxation time associated with a light hydrocarbon.

Embodiment 20

The apparatus of embodiment 18, further comprising calculating the hydrogen index of the light hydrocarbon volumetric based on the estimated longitudinal relaxation time.

In connection with the teachings herein, various analyses and/or analytical components may be used, including digital and/or analog subsystems. The system may have components such as a processor, storage media, memory, input, output, communications link (wired, wireless, pulsed mud, optical or other), user interfaces, software programs, signal processors and other such components (such as resistors, capacitors, inductors, etc.) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user, or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention.

What is claimed is:

1. A method of performing a nuclear magnetic resonance (NMR) measurement, the method comprising:
   disposing a NMR measurement device in a carrier in an earth formation, the NMR measurement device including a magnetic field source and a transmitting assembly;
   applying a static magnetic field into a formation by the magnetic field source, and emitting a plurality of pulse sequences by the transmitting assembly into the formation, the plurality of pulse sequences including at least a first pulse sequence having a first wait time and a second pulse sequence having a second wait time;
   receiving NMR measurement data including a long wait-time echo train and a short wait-time echo train, the long wait-time echo train based on the first pulse sequence and the short wait-time echo train based on the second pulse sequence;
   transforming, by a processor, the echo trains into volumetric portions including a first fluid volumetric portion, wherein transforming the echo trains includes applying a lateral-motion correction of the NMR measurement data, wherein the lateral-motion correction includes an identified motion artifact, wherein the identification is performed using NMR data;
   estimating a longitudinal relaxation time for the first fluid volumetric portion; and
   identifying whether the first fluid volumetric portion is gas or light oil based on the estimated longitudinal relaxation time.

2. The method of claim 1, wherein the static magnetic field has a gradient that is less than about 10 Gauss/cm.

3. The method of claim 1, wherein transforming the echo trains includes inverting the echo trains into a T2 distribution.

4. The method of claim 3, wherein the first wait time is selected to be greater than a longitudinal relaxation time associated with the first fluid volumetric portion.

5. The method of claim 2, further comprising moving the NMR measurement device axially along a borehole in the earth formation during application of the static magnetic field, emission of the plurality of pulse sequences and receipt of the NMR measurement data.

6. The method of claim 2, further comprising applying the static magnetic field to the formation, emitting the plurality of pulse sequences, and receiving the NMR measurement data while the NMR measurement device is substantially stationary within the borehole.

7. The method of claim 4, wherein identifying whether the first fluid volumetric portion is gas or light oil includes calculating an apparent diffusivity value based on the estimated longitudinal relaxation time and the T2 distribution, and determining whether the first fluid volumetric portion is gas or light oil based on the apparent diffusivity value.

8. The method of claim 4, wherein identifying whether the first fluid volumetric portion is gas or light oil is based on mud logging data.

9. The method of claim 3, wherein transforming the echo trains includes correcting the T2 distribution for an axial motion of the NMR measurement device.

10. The method of claim 4, wherein identifying whether the first fluid volumetric portion is gas or light oil includes calculating a ratio between the estimated longitudinal relaxation time and a T2 value derived from the T2 distribution, and determining whether the first fluid volumetric portion is gas or light oil based on the ratio.

11. The method of claim 1, further comprising determining at least one of a hydrogen index and a viscosity of the first fluid volumetric based on the estimated longitudinal relaxation time.

12. The method of claim 7, further comprising calculating a hydrogen index of the first fluid volumetric portion based on the calculated apparent diffusivity, from offset wells, or from mud logging data.

13. A nuclear magnetic resonance (NMR) apparatus for performing a nuclear magnetic resonance (NMR) measurement in an earth formation, the apparatus comprising:
an NMR measurement device configured to be disposed in a carrier in the earth formation, the NMR measurement device including a magnetic field source and a transmitting assembly, the magnetic field source configured to apply a static magnetic field into a formation, the transmitting assembly configured to emit a plurality of pulse sequences into the formation, the plurality of pulse sequences including at least a first pulse sequence having a first wait time and a second pulse sequence having a second wait time;
a processor configured to receive NMR measurement data including a long wait-time echo train and a short wait-time echo train, the long wait-time echo train based on the first pulse sequence and the short wait-time echo train based on the second pulse sequence, the processor configured to perform:
transforming the echo trains into volumetric portions including a first fluid volumetric portion, wherein transforming the echo trains includes applying a lateral-motion correction of the NMR measurement data, wherein the lateral-motion correction includes an identified motion artifact, wherein the identification is performed using NMR data;
estimating a longitudinal relaxation time for the first fluid volumetric portion; and
identifying whether the first fluid volumetric portion is gas or light oil based on the estimated longitudinal relaxation time.

14. The apparatus of claim 13, wherein the static magnetic field has a gradient that is less than about 10 Gauss/cm.

15. The apparatus of claim 13, wherein transforming the echo trains comprises an inverting the echo trains into a T2 distribution.

16. The apparatus of claim 15, wherein the first wait time is selected to be greater than a longitudinal relaxation time associated with the gas or light oil.

17. The apparatus of claim 15, further comprising calculating, with the processor, at least one of a hydrogen index and a viscosity of the first fluid volumetric portion based on the estimated longitudinal relaxation time.

18. The method of claim 3, further comprising determining a partial porosity of the first fluid volumetric portion based on the T2 distribution.

19. The method of claim 3, further comprising applying one or more cutoffs to separate the T2 distribution into different volumetric portions.

20. A method of performing a nuclear magnetic resonance (NMR) measurement, the method comprising:
disposing a NMR measurement device in a carrier in an earth formation, the NMR measurement device including a magnetic field source and a transmitting assembly;
applying a static magnetic field into a formation by the magnetic field source, and emitting a plurality of pulse sequences by the transmitting assembly into the formation, the plurality of pulse sequences including at least a first pulse sequence having a first wait time and a second pulse sequence having a second wait time;
receiving NMR measurement data including a long wait-time echo train and a short wait-time echo train, the long wait-time echo train based on the first pulse sequence and the short wait-time echo train based on the second pulse sequence;
transforming, by a processor, the echo trains into volumetric portions including a first fluid volumetric portion, wherein transforming the echo trains includes applying a lateral-motion correction of the NMR measurement data, wherein the lateral-motion correction includes an identified motion artifact;
estimating a longitudinal relaxation time for the first fluid volumetric portion;
determining at least one of a hydrogen index and a viscosity of the first fluid volumetric portion based on the estimated longitudinal relaxation time; and
identifying whether the first fluid volumetric portion is gas or light oil based on the estimated longitudinal relaxation time,
wherein the static magnetic field of the magnetic field source has a gradient that is less than about 10 Gauss/cm.

* * * * *